Patented Sept. 14, 1937

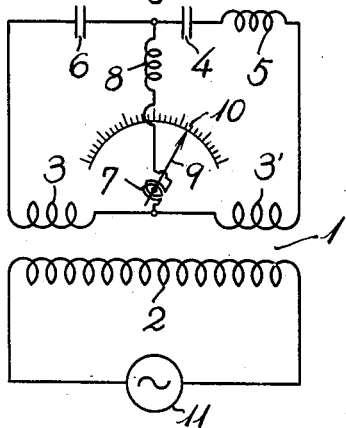
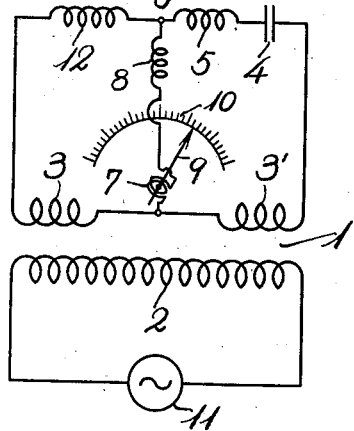

2,093,204

UNITED STATES PATENT OFFICE 2,093,204

FREQUENCY METER

Jisuke Miyazaki, Tokyo, Japan

Application June 5, 1935, Serial No. 25,151
In Japan February 19, 1934

4 Claims. (Cl. 172—245)

This invention relates to improvements in frequency meters.

Various direct-reading frequency meters have been proposed, in which the principle of zero method is used. But, with such frequency meters, a telephone or other null indicator is required and the operator should take the balance of the bridge on the telephone or other null indicator by adjusting the impedances of the ratio arms of the bridge manually, and the direct reading is taken by suitably calibrating the value of the adjustable impedance or impedances in frequency terms.

The principal object of this invention is to provide an automatic self-indicating frequency meter whereby the accuracy of zero method is maintained without using any null indicator and the balance of the bridge may automatically be taken.

Another object of this invention is to provide a frequency meter whereby the pointer may be deflected by the current passing through the galvanometer arm of an electric bridge and the bridge is automatically balanced as the pointer is moved, the pointer being automatically stopped in the deflected position to allow the direct reading of the measurement.

A further object of this invention is to provide a frequency meter of self-indicating type whereby the same reading may be obtained irrespective of the voltage applied to the meter.

In accordance with this invention, an impedance bridge comprising capacitors and inductance coils is used. A moving coil is inserted in the galvanometer arm of the bridge in such a manner that the moving coil rotates so long as an unbalanced current passes through the moving coil and as the moving coil rotates the bridge is automatically rebalanced. No restoring means is associated with the moving coil so that the latter stops at the deflected position. The pointer is attached to the moving coil.

My invention will be better understood from the following description when considered in connection with the accompanying drawing and its scope will be pointed out in the appended claims.

In the accompanying drawing, Fig 1 illustrates a frequency meter embodying this invention and Fig. 2 is a connection diagram illustrating another modification.

Referring to Fig. 1, I represents a transformer serving as a source for energizing the bridge hereinbelow described and 2 is its primary winding. The secondary winding of the transformer I is divided into two sections 3 and 3'. These winding sections 3 and 3' are respectively connected in two ratio arms of an impedance bridge. An inductance coil 5 and a capacitor 4 connected in series with the coil 5 constitutes another ratio arm of the bridge, the remainder ratio arm being formed by a capacitor 6. The moving coil 7 is inserted in the galvanometer arm in series with a phase regulating inductance coil 8. The moving coil 7 is located in an alternating magnetic field produced by the primary winding 2 of the transformer I. For this purpose, the moving coil 7 may for instance, be arranged in the air gap of the iron core of the transformer I. Accordingly, the moving coil 7 is electro-magnetically coupled with the secondary windings 3 and 3' of the transformer I so that as the moving coil 7 rotates the mutual inductance between the coil 7 and the winding 3 or 3' may automatically be changed to rebalance the bridge, as the angle subtended between the winding surface of these two coils changes. The pointer 9 of the meter is attached to the moving coil 7. 10 designates a reading scale and 11 is an alternating current source the frequency of which is to be measured. It should be noted that the moving coil 7 has no restoring bias means as in prior meters using the principle of zero method and it may be stopped in any deflected position.

The operation of the frequency meter is as follows: Assume that the bridge is energized from the source 11 under measurement. The inductance coils and the condensers have different impedance values as the frequency source is changed. If the bridge is unbalanced the unbalanced current will flow through the moving coil 7. Then the coil 7 will be subjected to a torque produced by the mutual action between the current passing through the coil 7 itself and the intensity of the magnetic field in which the coil 7 is located. The rotation of the coil 7 will change the mutual inductances between the coils 7 and 3 and 3' respectively and thus the impedance ratio of the bridge arms will be automatically changed to rebalance the bridge. Then, the moving coil 7 and hence the pointer 9 stops in the deflected position and the frequency of the source may be read directly on the scale 10. The pointer 9 may be rotated in either direction and the pointer 9 will give the precise result no matter in what position the pointer 9 is originally situated. By suitably designing the phase regulating reactor 8 the current passing through the galvanometer arm will become in phase with the current passing through the ratio arms so that the torque will be increased, if otherwise, the torque will be comparatively small, and the bridge will be rebalanced automatically. By the opposite frequency dependency of the inductance and capacitance, the sensitivity of the present meter is very much increased. Moreover, the pointer 9 stops when there is no current passing through the coil 7. Accordingly the indication will be independent of the source voltage. When the bridge is unbalanced, as when a resistance 5 whose value is different from resistance 6 is inserted in the circuit, a definite potential difference responsive to the value of resistance 5 is produced across the moving coil to cause current to flow through the coil 7. If the coil 7 varies its angular position with respect to the coils 3 and 3' and induces an electro-motive force opposite and equal to the former potential difference across the moving coil, then the bridge will rebalance. The rebalance of bridge is reached experimentally as well as theoretically.

In Fig. 2, an inductance coil 12 is substituted for the capacitor 6, other arrangement being same as shown in Fig. 1. Since the operation is the same as explained above in connection with Fig. 1, I have omitted its detailed explanation.

While I have shown and described my invention in considerable detail, I do not desire to be limited to the exact arrangements shown but seek to cover all those modifications that fall within the true spirit and scope of my invention.

What I claim as new and desire to secure by Letters Patent of the United States is:

1. A frequency meter comprising a transformer including a primary winding and a secondary winding divided into two sections, the primary winding being connected to an electric source under measurement, four impedance ratio arms connected in a Wheatstone bridge form adapted to be supplied with electric current from the primary winding of said transformer, said two winding sections constituting two of the said four ratio arms of the bridge, a moving coil inserted in the galvanometer arm of said bridge in electromagnetically coupled relation with said two winding sections in the magnetic field produced by said transformer, a pointer operated by said moving coil and adapted to be stopped in the deflected position, and a frequency scale co-operating with said pointer.

2. A frequency meter comprising a transformer connected to the electric source under measurement and having its secondary winding divided into two sections, a capacitator, a reactance coil, said two divided winding sections, said capacitator, and said reactance coil, respectively, forming four ratio arms of a Wheatstone bridge, a moving coil inserted in the galvanometer arm of said bridge in electro-magnetically coupled relation with said two winding sections in the magnetic field produced by said transformer so that rebalancing electro-motive force may be induced in said moving coil through the mutual induction between the same and the divided winding sections as said moving coil rotates to automatically rebalance the bridge, a phase regulating inductance coil in series with said moving coil, a pointer attached to said moving coil and adapted to be stopped in the deflected position, and a frequency scale co-operating with said pointer.

3. A frequency meter comprising a transformer connected to the electric source the frequency of which is to be measured and having its secondary winding divided into two sections, a capacitator, a reactance coil and a second capacitator connected with said coil, said divided winding sections, the first capacitator, and the connected capacitator and reactance coil, respectively, forming four ratio arms of a Wheatstone bridge, a moving coil inserted in the galvanometer arm of said bridge in the magnetic field produced by said transformer so that said moving coil may be electro-magnetically coupled with the said two winding sections to induce rebalancing electromotive force in said moving coil through the mutual induction between them as said moving coil rotates, thereby automatically rebalancing said bridge, a phase regulating inductance coil in series with said moving coil, a pointer attached to said moving coil and adapted to be stopped in the deflected position, and a frequency scale co-operating with said pointer.

4. A frequency meter comprising a transformer connected to the electric source under measurement and having a secondary winding divided into two sections, an inductance coil, a capacitator and a second inductance coil connected with said capacitator, said divided winding sections, said inductance coil, and the connected inductance coil and capacitator, respectively, forming four ratio arms of a Wheatstone bridge, a moving coil inserted in the galvanometer arm of said bridge in electro-magnetically coupled relation with said two winding sections in the magnetic field produced by said transformer, a phase regulating inductance coil in series with said moving coil, a pointer attached to said moving coil and adapted to be stopped in the deflected position, and a frequency scale co-operating with said pointer.

JISUKE MIYAZAKI.